US007783612B2

(12) United States Patent
Houk et al.

(10) Patent No.: US 7,783,612 B2
(45) Date of Patent: Aug. 24, 2010

(54) CREATION OF OPTIMIZED TERRAIN DATABASES

(75) Inventors: Richard Houk, Evergreen, CO (US); Michael Fox, Centennial, CO (US); Jens Schiefele, Wiesbaden Breckenhaim (DE); Marc Launer, Darmstadt (DE)

(73) Assignee: The Boeing Company, Chicago, IL (US)

( * ) Notice: Subject to any disclaimer, the term of this patent is extended or adjusted under 35 U.S.C. 154(b) by 342 days.

(21) Appl. No.: 11/233,234

(22) Filed: Sep. 21, 2005

(65) Prior Publication Data
US 2007/0255729 A1 Nov. 1, 2007

(51) Int. Cl.
*G06F 7/00* (2006.01)
*G06F 15/16* (2006.01)
(52) U.S. Cl. .................. 707/690; 701/120; 701/200; 701/301; 340/970; 340/961; 356/3.01; 356/3.16; 356/5.01; 356/5.09; 707/918; 707/919; 707/920
(58) Field of Classification Search ................. 701/300, 701/301, 14, 11; 707/104, 687, 688, 689, 707/690, 691; 340/945; 342/350; 1/1; 356/3.01–316, 356/5.01–5.09
See application file for complete search history.

(56) References Cited

U.S. PATENT DOCUMENTS

| 2,847,855 A | * | 8/1958 | Berger ..................... 73/178 R |
| 4,646,244 A | * | 2/1987 | Bateman et al. ............. 701/301 |
| 4,675,823 A | * | 6/1987 | Noland ....................... 701/300 |

(Continued)

OTHER PUBLICATIONS

Fabio Dell' Acqua and Paolo Gamba, "Preparing an Urban Test Site for SRTM Data Validation" Oct. 2002, IEEE, vol. 40, p. 2248-2256.*

(Continued)

*Primary Examiner*—Tony Mahmoudi
*Assistant Examiner*—Dennis Truong
(74) *Attorney, Agent, or Firm*—Armstrong Teasdale LLP (57) ABSTRACT

Systems and methods for generating an optimized terrain database identify several regions, including test regions that are established from the identified regions. A first set of terrain data is received for a first test region. The first set of terrain data is compared to a second set of terrain data to determine a set of quality attributes. The quality attributes are used to determine a safety margin for the first test region. The safety margin is applied to other regions having the same or similar characteristics to the first test region. Safety margins are either generated for or applied to all other regions. All regions are then compiled into an area-wide terrain database, up to and including a worldwide database.

14 Claims, 8 Drawing Sheets

U.S. PATENT DOCUMENTS

| | | | | |
|---|---|---|---|---|
| 5,313,396 | A | 5/1994 | Terpstra et al. | 364/443 |
| 5,335,181 | A * | 8/1994 | McGuffin | 701/200 |
| 5,402,340 | A * | 3/1995 | White et al. | 702/5 |
| 6,073,076 | A | 6/2000 | Crowley et al. | 701/208 |
| 6,208,934 | B1 | 3/2001 | Bechtolsheim et al. | 701/209 |
| 6,374,182 | B2 | 4/2002 | Bechtolsheim et al. | 701/209 |
| 6,438,561 | B1 | 8/2002 | Israni et al. | 707/104.1 |
| 6,785,594 | B1 * | 8/2004 | Bateman et al. | 701/9 |
| 6,853,332 | B1 * | 2/2005 | Brookes | 342/191 |
| 7,194,389 | B2 * | 3/2007 | Damron | 703/2 |
| 2001/0056316 | A1 * | 12/2001 | Johnson et al. | 701/14 |
| 2002/0113719 | A1 * | 8/2002 | Muller et al. | 340/961 |
| 2006/0097895 | A1 * | 5/2006 | Reynolds et al. | 340/961 |
| 2007/0050101 | A1 * | 3/2007 | Sacle et al. | 701/11 |
| 2007/0088492 | A1 * | 4/2007 | Bitar et al. | 701/120 |

OTHER PUBLICATIONS

Slatton, K.C.; Crawford, M.M.; Evans, B.L.; "Combining interferometric radar and laser altimeter data to improveestimates of topography";Geoscience and Remote Sensing Symposium, 2000. Proceedings. IGARSS 2000. IEEE 2000 InternationalPublication Date: 2000; vol. 3, on pp. 960-962 vol. 3.*

* cited by examiner

CREATION OF OPTIMIZED TERRAIN DATABASES

TECHNICAL FIELD

This application relates generally to systems, methods, and tools to generate and/or modify terrestrial mapping data. More particularly, this application relates to aviation terrain databases having a safety envelope.

BACKGROUND

A terrain database is a set of geographic data that includes information about the terrain at certain locations. For instance, the terrain database can provide the latitude, longitude, elevation from sea level, and slope information for locations in a geographic region. In addition to terrain data, the database may also have obstacle data for such things as buildings, radio towers, etc. Terrain databases are utilized in combination with a number of sensors, such as global positioning system (GPS) sensors, to generate functions of actual surface terrain features of a traveling vehicle, such as an aircraft, boat, or automobile. These functions are typically utilized in aircraft to enhance orientation, situational awareness, and guidance, and to provide alerts and warnings to pilots in flight management systems, such as a terrain awareness and warning system (TAWS), enhanced ground proximity warning system (EGPWS), and runway approach systems.

The geographic data in these databases are generated by a variety of methods, including actual physical measurements or remotely generated estimations of the elevations of geographic features in a given area. Generally, the methods using physical measurements take a sample of physical measurements at specific or randomly generated locations and estimate elevations for the remainder of the area not actually measured. To create remote estimations, a remote sensing system approximates an elevation for locations in the geographic region, such as by using light detecting and ranging (LIDAR) mapping, satellite-based mapping, aerial photography, and other known techniques. An example remote sensing system is the interferometric synthetic aperture radar (IFSAR) system used by the Shuttle Radar Topography Mission (SRTM) to acquire topographic data on 80% of the Earth's land mass. Each source data point in these databases represents a specific elevation at a location on the earth's surface (geo-referenced), often correlated to an earth model known as the WGS 84 reference system.

Depending on the method used to generate the terrain database, inaccuracies are introduced into the data. For example, the SRTM data is not as accurate when measuring the elevations of a sandy area, such as a desert, because the signal used in the IFSAR system can penetrate sand. Thus, the actual elevation of the sandy area is often higher than the estimation generated by the SRTM. Besides the inaccuracies inherent in the measurement system used, the method of compiling the data can contribute additional inaccuracies. For instance, a database may be generated from a few fairly precise location data points. However, the information is only accurate at certain locations, and the elevations between these points may be incorrect. For these reasons, databases generated by different source organizations, which use different extrapolation or estimation methodologies, generally provide conflicting information for the same geographic regions.

To compensate for the inaccuracies and ensure the safety of aircraft that must fly over the terrain, a minimum altitude safety envelope is established for the geographic region. Generally, a safety organization, such as the Federal Aviation Administration (FAA), provides a safety envelope for the entire region that is based on a known highest point in the region, often taken from a pre-existing paper map. For example, if the highest mountain in a 50-by-50 mile region has an elevation of 14,556 feet, then the minimum elevation for the entire 50-by-50 mile region will be higher than 14,556 feet. This type of minimum altitude envelope tends to produce many unnecessary alerts and warnings (nuisance alerts), which a pilot may learn to ignore, thus causing the pilot to become desensitized to more important warnings. In addition, a standard method is to apply a fixed buffer to the entire database. These buffers are usually between 1,000 ft and 3,000 ft high and also tend to generate numerous nuisance alerts. It is with respect to these and other considerations that the present invention was developed.

SUMMARY

Embodiments of the present disclosure relate to systems and methods for generating a certifiable terrain database. In embodiments, several test regions are identified. A test region is a section or defined area of the surface of the earth that has mathematically describable characteristics. A first set of terrain data is received for a first test region generated by a single data acquisition method. The first set of terrain data is compared to a second set of terrain data to determine a set of quality attributes. The quality attributes then help to determine, for the test region, a safety margin that is related to a predetermined confidence level. The safety margin can be applied to one or more elevations to create a safety envelope for the test region. The first test region is then compared to other regions that have the same or similar characteristics. If the characteristics are similar, and a similar method was used to collect the terrain data for the other regions, the safety margin from the first test region can be applied to the other regions. The process of generating quality attributes and safety envelopes for different test regions, or applying known safety margins to the elevations of similar regions, continues until all regions have been assigned a safety envelope. In this way, a worldwide terrain database having the same confidence level is generated without unnecessary and costly quality measurements in all areas of the world.

The embodiments described may be implemented as a computer process, a computing system, or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

A more complete appreciation of the present exemplary embodiments and their improvements can be obtained by reference to the accompanying drawings, which are briefly summarized below, the following detailed description of the presently exemplary embodiments, and the appended claims.

DETAILED DESCRIPTION

The present exemplary embodiments will now be described more fully with reference to the accompanying drawings. The disclosure should not be construed as limited to the exemplary embodiments set forth herein. Rather, these exemplary embodiments are provided so that the disclosure will be thorough and complete and will fully convey the scope of the possible embodiments to those skilled in the art.

Figure 1A:
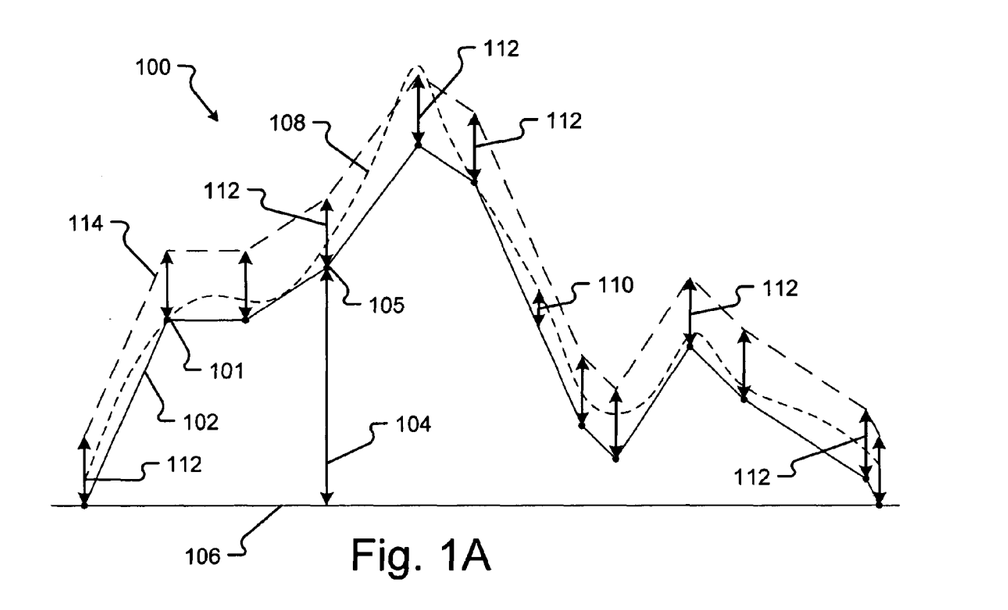
FIGS. 1A and 1B are exemplary embodiments of terrain databases having quality attributes established for a first test region and applied to a second region according to the present disclosure.

A cross sectional view of an exemplary embodiment of a terrain database 100 is shown in FIG. 1A. In embodiments, the terrain database 100 contains information about the terrain of a region. The exemplary embodiment of the terrain database 100 is a "three-dimensional database" that stores and provides terrain data on locations and elevations. However, to simplify the discussion of the terrain database, FIG. 1A shows a cross-sectional view of only a portion of the total terrain database.

In embodiments, the terrain database 100 provides one or more data points, such as data point 101. A data point can comprise data that includes, but is not limited to, a location, in longitude and latitude, and/or an elevation above sea level. The line 106 represents sea level. The arrow 104 represents an exemplary elevation for a location 105 in the terrain database 100. Upon receiving information for and "connecting" a plurality of data points, the terrain database 100 can provide an exemplary depiction of the terrain, as is represented by line 102. Line 102 represents the elevation at any location as is extrapolated from the collected data points.

To establish an optimized terrain database, an area, either encompassing all or a portion of the earth's surface, is sectioned into a plurality of regions. A region is an area of the earth delineated by some location boundary. For example, a region may comprise an area in a 20-by-20 mile square on the surface of the earth. The terrain database 100, shown in FIG. 1A, may be a cross section view of a region. In embodiments, a region encompasses a portion of the earth with certain predetermined characteristics, such as geographic characteristics. For instance, a region may comprise a mountainous region, rolling hills, or a flat desert region. In other embodiments, the predetermined characteristics of the regions may include, but are not limited to, use characteristics (such as urban, vegetation, or agricultural designations), method of collection used for the terrain data (such as SRTM or LIDAR), population, country, or landmarks. A plurality of regions may be identified.

In embodiments, regions having similar characteristics are grouped into sets of regions. One or more regions (or portions of one or more regions) in each set may be designated as "test regions." A test region is a single region or portion of a region where the quality of the terrain data can be assessed in detail.

Line 102 in FIG. 1A represents a first set of terrain data for a test region. The terrain data 102 is compared to another set of terrain data, such as the data represented by line 108. In embodiments, terrain data 102 was collected using a first collection method, such as SRTM data. The terrain data 108 is generated by a second collection method, such as LIDAR. In embodiments, one collection method is used in more or larger areas (such as SRTM), while the other method is a highly accurate collection method used only for small areas (such as LIDAR). By using these two types of collection methods, an error margin for the less accurate collection method can be obtained by comparing it to the highly accurate collection method.

The comparison of the two sets of terrain data 102 and 108 provides a plurality of "error margins," which are differences between the elevations represented by line 102 and line 108. An exemplary error margin 110 shows the difference in elevation between terrain data 102 and terrain data 108 at a certain location. By collecting a plurality of error margins, an error margin distribution is generated. The error margin distribution represents the difference between the two collection methods over an area of terrain having certain characteristics, as represented by the test region. Using the error margin distribution, an exemplary safety margin is selected. For instance, if 99.9% of all errors are 50 feet or less, a safety margin of 50 feet ensures that substantially all actual elevations are less than the combination of the safety margin and the elevation reported by the database. After the safety margin is applied to the plurality of elevations, a "safety envelope" is generated for the test region. In the embodiment shown in FIG. 1A, safety margins, represented by arrows 112, are added to the terrain data 102 to create the safety envelope 114. The elevations represented by line 114 form the optimized terrain data.

Figure 1B:
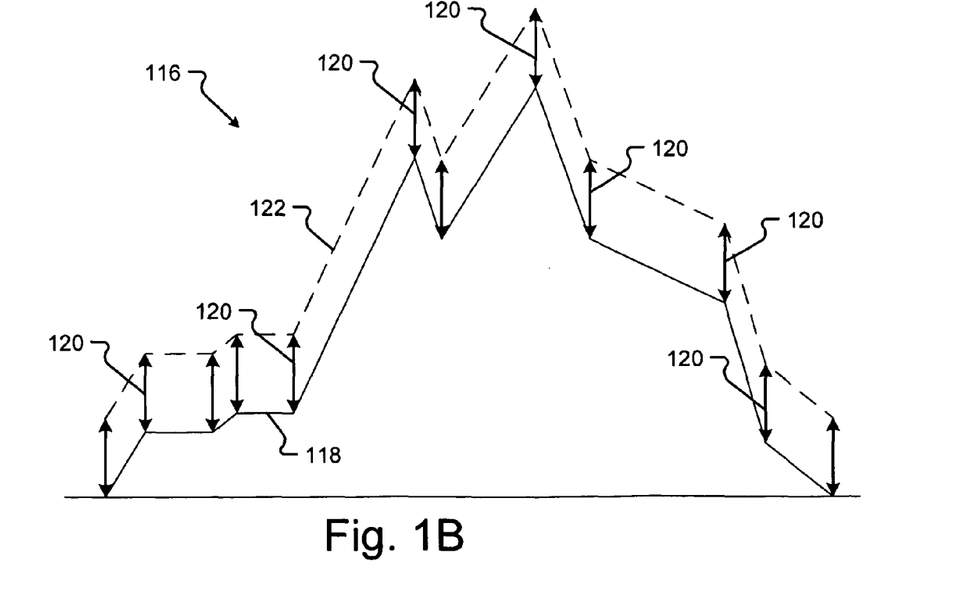

In further embodiments, a second region defined by terrain database 116 is shown in FIG. 1B. The region of FIG. 1B has the same or similar characteristics to the test region shown FIG. 1A and is part of the same set of regions. Terrain data, represented by line 118, is collected with the same, less accurate collection method as the terrain data 102 for the test region in FIG. 1A. As such, an exemplary error margin distribution is known for this type of collection method used on a region with the same or similar characteristics, because the error margin distribution was already calculated for a test region with the terrain database 100 in FIG. 1A. In addition, an exemplary safety margin, as represented by arrows 112 in FIG. 1A, was previously calculated for the type of collection method used on the test region having the same or similar characteristics. Thus, in order to create the terrain database 116 with a safety envelope, the safety margin 112 already calculated for the test region in FIG. 1A is applied to the new region in FIG. 1B. Arrows 120, which have the same value as arrows 112, represent the applied safety margin. As such, terrain values with a safety envelope, represented by line 122, are created for other regions without the costly and time-consuming error analysis applied to the test region terrain database 100 in FIG. 1A. Once a safety margin has been created or applied to all the various regions, the regions can be merged into a terrain database encompassing a large, contiguous area (such as a country or even, in one embodiment, a worldwide database).

Figure 2:
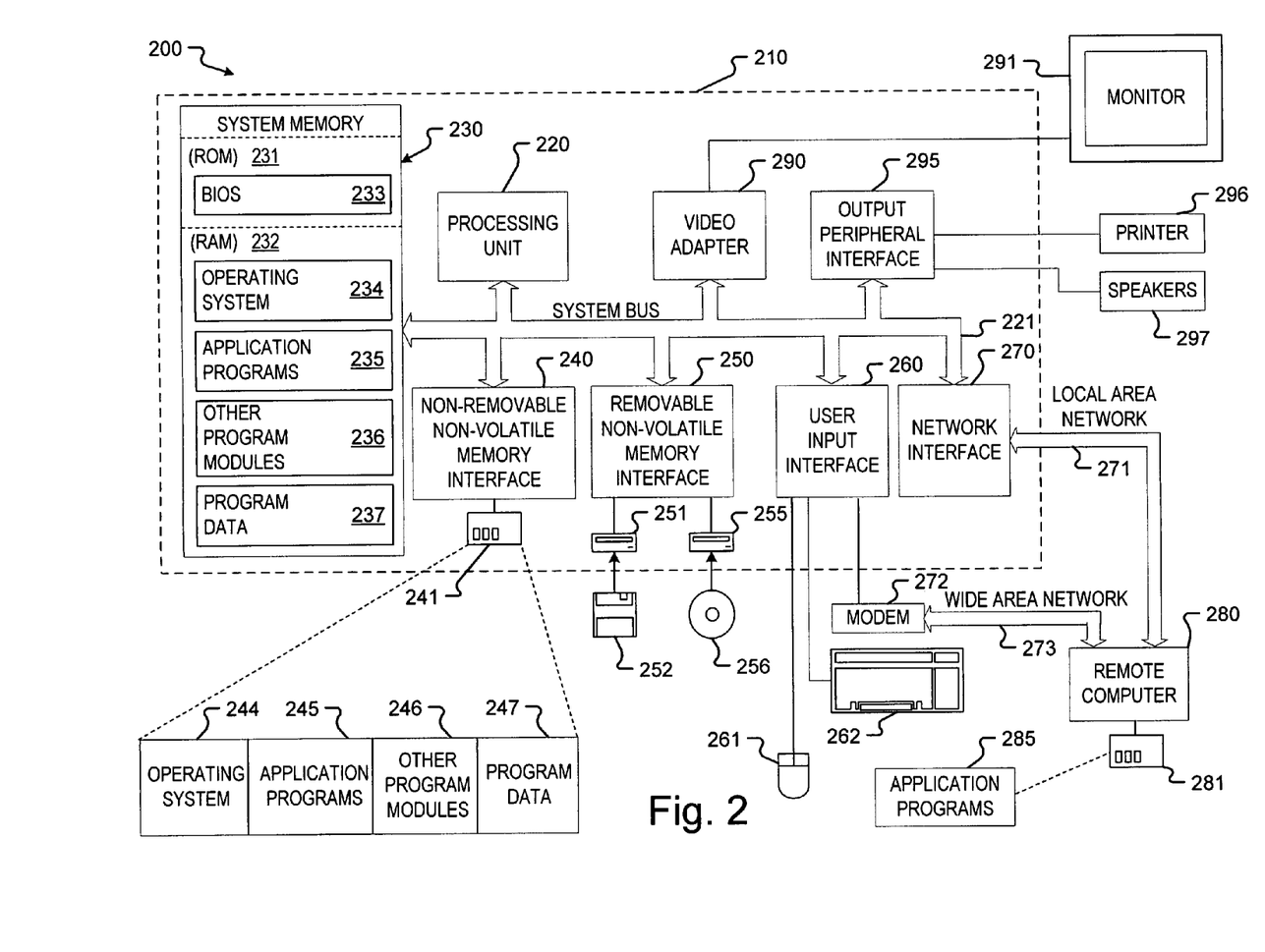
FIG. 2 is a functional diagram illustrating a computer environment and computing device operable to provide a terrain database according to the present disclosure.

An example of a suitable computing system environment 200 for implementing the present invention is illustrated in FIG. 2. The computing system environment 200 is only one example of a suitable computing environment and is not intended to suggest any limitation as to the scope of use or functionality. Neither should the computing environment 200 be interpreted as having any dependency on or requirement relating to any one or a combination of components illustrated in the exemplary operating environment 200.

The exemplary embodiments presented in this disclosure are operational with numerous other general purpose or special purpose computing system environments or configurations. Examples of well known computing systems, environments, and/or configurations that may be suitable for use with the embodiments include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary embodiments may be described in the general context of computer-executable instructions, such as program modules, being executed by a computer. Generally, program modules include routines, programs, objects, components, data structures, etc. that perform particular tasks or implement particular abstract data types. The exemplary embodiments may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary computer system 200 for implementing the exemplary embodiments includes a general purpose-computing device in the form of a computer 210. Components of the computer 210 may include, but are not limited to, a processing unit 220, a system memory 230, and a system bus 221 that couples various system components including the system memory 230 to the processing unit 220. The system bus 221 may be any of several types of bus structures including a memory bus or memory controller, a peripheral bus, or a local bus using any of a variety of bus architectures. By way of example, and not limitation, such architectures include the Industry Standard Architecture (ISA) bus, the Micro Channel Architecture (MCA) bus, the Enhanced ISA (EISA) bus, the Video Electronics Standards Association (VESA) local bus, the Universal Serial Bus (USB), and the Peripheral Component Interconnect (PCI) bus, also known as the Mezzanine bus.

Computer 210 typically includes a variety of computer readable media. Computer readable media can be any available media that can be accessed by the computer 210 and includes both volatile and nonvolatile media and removable and non-removable media. By way of example, and not limitation, computer readable media may comprise computer storage media and communication media. Computer storage media includes volatile, nonvolatile, removable, and non-removable media implemented in any method or technology for storage of information such as computer readable instructions, data structures, program modules, or other data. Computer storage media includes, but is not limited to, RAM, ROM, EEPROM, flash memory or other memory technology, USB memory storage devices, CD-ROM, digital versatile disks (DVD) or other optical disk storage, magnetic cassettes, magnetic tape, magnetic disk storage or other magnetic storage devices, or any other medium which can be used to store the desired information and which can accessed by computer 210. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of the any of the above should also be included within the scope of computer readable media.

The system memory 230 includes computer storage media in the form of volatile and/or nonvolatile memory, such as read only memory (ROM) 231 and random access memory (RAM) 232. A basic input/output system 233 (BIOS), containing the basic routines that help to transfer information between elements within computer 210, such as during start-up, is typically stored in ROM 231. RAM 232 typically contains data and/or program modules that are immediately accessible to and/or presently being operated on by processing unit 220. By way of example, and not limitation, FIG. 2 illustrates operating system 234, application programs 235, other program modules 236, and program data 237; a terrain database and system to create the terrain database, such as terrain database 100 (FIG. 1A), would be stored as program data 237 and displayed from RAM 232.

The computer 210 may also include other removable/non-removable, volatile/nonvolatile computer storage media. By way of example only, FIG. 2 illustrates a computer 210 with a non-removable, non-volatile memory interface 240 that reads from or writes to non-removable, nonvolatile magnetic media 241, such as a hard drive. Computer 210 may also include a non-volatile memory interface 250 that reads from or writes to a device 251, such as a disk drive, that reads from or writes to a removable, non-volatile media 252, such as a magnetic disk. In addition, the computer 210 may include an optical disk drive 255 that reads from or writes to a removable, nonvolatile optical disk 256, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, USB memory storage devices, solid state RAM, solid state ROM, and the like. The hard disk drive 241 is typically connected to the system bus 221 through a non-removable memory interface, such as interface 240, and flash memory drive 251 and optical disk drive 255 are typically connected to the system bus 221 by a removable memory interface, such as interface 250.

The drives and their associated computer storage media discussed above and illustrated in FIG. 2, provide storage of computer readable instructions, data structures, program modules, and other data for the computer 210. For example, hard disk drive 241 is illustrated as storing operating system 244, application programs 245, other program modules 246, and program data 247, which can either be the same as or different from operating system 234, application programs 235, other program modules 236, and program data 237. Operating system 244, application programs 245, other program modules 246, and program data 247 are given different numbers here to illustrate that, at a minimum, they are different copies.

A user may enter commands and information into the computer 210 through a user input interface 260 connected to user input devices, such as a keyboard 262 and pointing device 261, commonly referred to as a mouse, trackball, or touch pad. Other input devices (not shown) may include a microphone, joystick, game pad, satellite dish, scanner, or the like. These and other input devices are often connected to the processing unit 220 through a user input interface 260 that is coupled to the system bus 221, but may be connected by other interfaces and bus structures, such as a parallel port, game port, or a universal serial bus (USB).

A monitor 291 or other type of display device is also connected to the system bus 221 via an interface, such as a video interface 290. In addition to the monitor 291, the computer 210 may also include other peripheral output devices such as speakers 297 and printer 296, which may be connected through an output peripheral interface 295.

The computer 210 may operate in a networked environment using logical connections to one or more remote computers, such as a remote computer 280. The remote computer 280 may be a personal computer, a server, a router, a network PC, a peer device, or other common network node, and typically includes many or all of the elements described above relative to the computer 210, although only a memory storage device 281 has been illustrated in FIG. 2. The logical connections depicted in FIG. 2 include a local area network (LAN) 271 and a wide area network (WAN) 273, but may also include other networks, such as wireless networks. Such networking environments are commonplace in offices, enterprise-wide computer networks, intranets, and the Internet.

When used in a LAN networking environment, the computer 210 is connected to the LAN 271 through a network interface or adapter 270. When used in a WAN networking environment, the computer 210 typically includes a modem 272 or other means for establishing communications over the WAN 273, such as the Internet. The modem 272, which may be internal or external, may be connected to the system bus 221 via the user input interface 260, or other appropriate mechanism. In a networked environment, program modules depicted relative to the computer 210, or portions thereof, may be stored in the remote memory storage device 281. By way of example, and not limitation, the remote application programs 285 reside on memory device 281. It will be appreciated that the network connections shown are exemplary and other means of establishing a communications link between the computers may be used.

Figure 3:
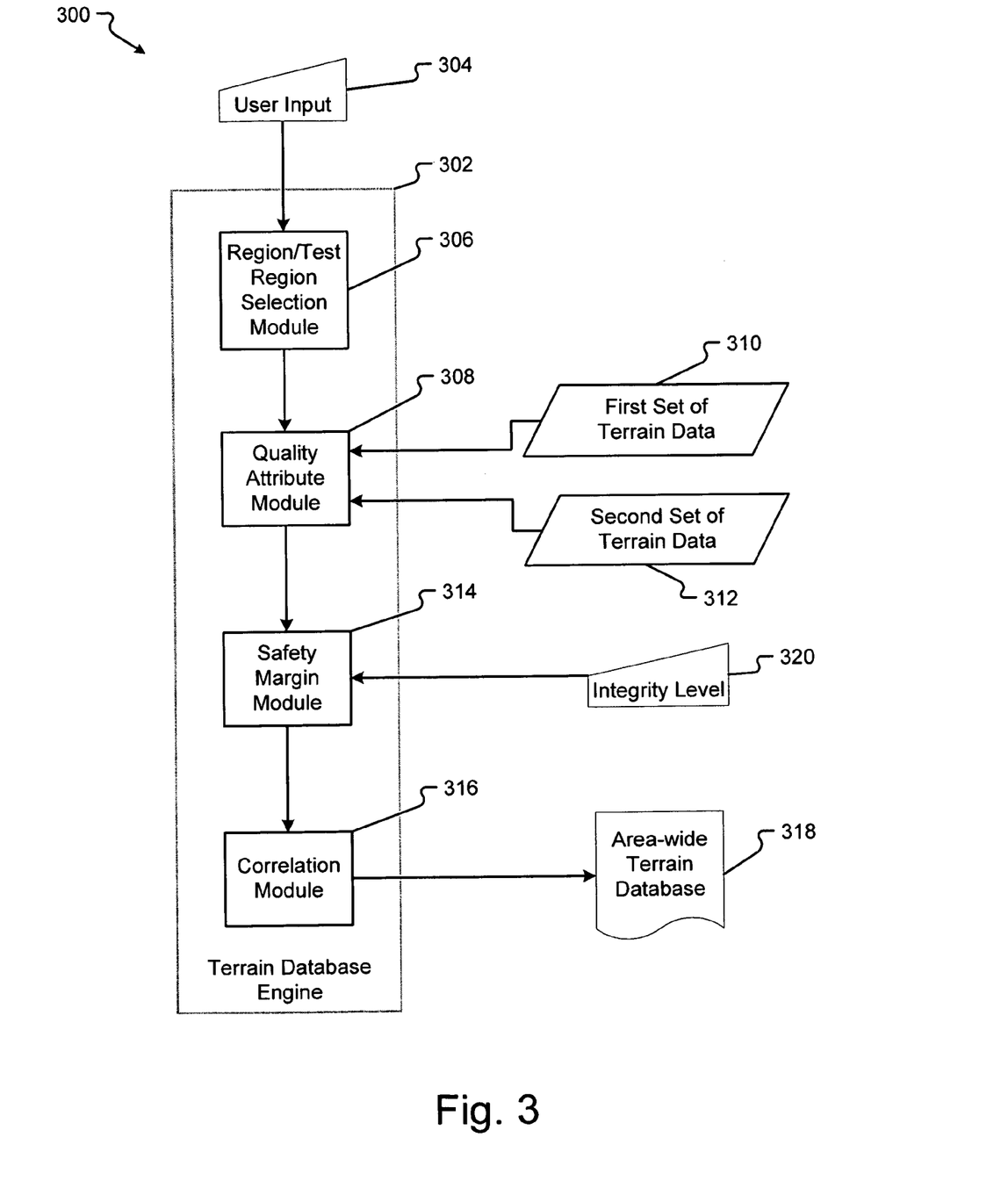
FIG. 3 is a functional diagram of an exemplary embodiment of a system to create an optimal terrain database according to the present disclosure.

An exemplary system 300 for creating optimal terrain databases is shown in FIG. 3. The system 300, in embodiments, comprises a terrain database engine 302 that receives inputs and/or provides outputs. In embodiments, the inputs comprise a user input 304, a first set of elevation data 310, a second set of elevation data 312, and a confidence or integrity level 320, all of which are explained hereinafter. An exemplary output is an area terrain database 318 having optimized terrain data.

The terrain database engine 302 comprises, in embodiments, a region/test region selection module 306, a quality attribute module 308, a safety margin module 314, and/or a correlation module 316. In embodiments, the region/test region selection module 306 identifies and establishes a plurality of regions and test regions. In one embodiment, a user input 304 provides a selection of the region and/or test region. For instance, a user identifies and/or assigns a boundary around a region in the terrain database that is delineated by a set of locations. In other words, the user may choose locations in the terrain database that encompass or enclose the region and/or test region. The user may choose the region based on the terrain type or other characteristics. In another embodiment, the region/test region selection module 306 automatically selects the regions and/or test regions. For instance, the terrain database may include terrain type information for portions of a terrain database. The region/test region selection module 306 establishes a region for and around the portions of the terrain database having certain types of terrain. In embodiments, the region/test region selection module 306 groups regions having the same or similar characteristics into sets of regions.

One or more test region selections are sent to the quality attribute module 308. The quality attribute module 308 determines quality attributes for one or more of the plurality of test regions. In one embodiment, the quality attribute module 308 receives a first set of terrain data 310. The first set of terrain data 310 provides terrain data for the test region and is compiled using a certain collection method or system. The quality attribute module 308 also receives a second set of terrain data 312 that also provides terrain data for the test region, but which is compiled using a different collection method or system from the first set of terrain data 310. In embodiments, the first set of terrain data 310 is compiled using a less accurate method, but a method that has terrain data for much of the earth's surface (such as SRTM). The second set of terrain data 312 is compiled using a highly accurate method (such as LIDAR), but a method that has terrain data for only limited areas of the earth's surface.

The quality attribute module 308 compares the first set of terrain data 310 with the second set of terrain data 312. In embodiments, the quality attribute module 308 correlates data points in the first set of terrain data 310 to data points in the second set of terrain data 312 that have the same or nearly the same location. Then, the quality attribute module 308 determines an elevation error margin by subtracting the elevation for a first data point in the first set of terrain data 310 from the elevation of the correlated data point in the second set of terrain data 312. The elevation error margin for each correlated data point is determined. Each difference in elevation is stored as part of an error margin density function, as is explained in conjunction with FIG. 4.

The error margin distribution is sent to the safety margin module 314. The safety margin module 314 determines and applies the safety margin for the test region. In embodiments, the safety margin module 314 receives a confidence or integrity level 320 from a user. The integrity level 320 is a confidence interval or desired safety level for the terrain data in the test region. For instance, a confidence interval may be $10^{-3}$, which represents that only 1 in a thousand actual elevations is above the safety envelope, or $10^{-6}$, which represents that only 1 in a million actual elevations is above the safety envelope. The safety margin module 314 determines the elevation, in the error margin distribution, that represents the desired confidence level, as is explained in conjunction with FIG. 4. The safety margin module 314 sends the safety margin selection to the correlation module 316.

The correlation module 316 correlates test regions with other regions having the same or similar characteristics as the test regions. In embodiments, the test region having a determined safety margin is compared to one or more other regions. The correlation module 316 determines if the two regions have similar types of terrain and similar collection methods for the terrain data. If two regions correlate, the correlation module 316 applies the safety margin from the test region to the correlated region. This process continues until a measured safety margin has been applied to all test regions and a correlated safety margin has been applied to all other regions. All regions having the same confidence level, e.g., $10^{-7}$, are assembled into an area terrain database 318 and provided to the user.

Figure 4:
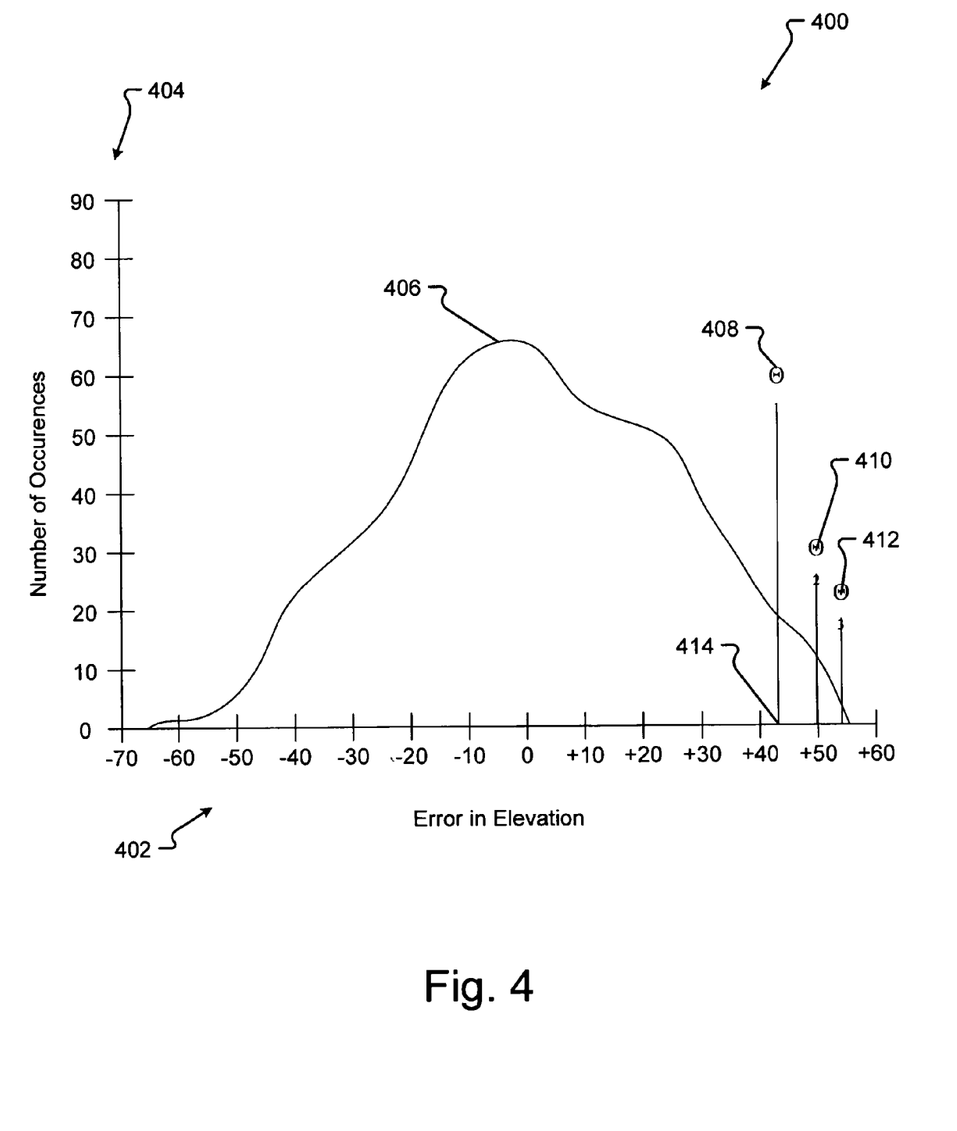
FIG. 4 is an exemplary embodiment of an error margin distribution function for a test region and an exemplary embodiment of a safety margin established for the test region according to the present disclosure.

A graphical representation of an error margin distribution 400 with determined safety margins is shown in FIG. 4. The graph is formed in two axes. The first axis 402 represents the amount of error margin in the elevation between two data points in two sets of terrain data. The second axis 404 represents the number of occurrences for the specific error margin in elevation. The error margin occurrences form the error margin distribution 406.

In the exemplary embodiment, a safety margin is established for a provided confidence level. In embodiments, one of three or more confidence levels is provided, $\Theta_1$ (408), $\Theta_2$ (410), and $\Theta_3$ (412). A safety margin is then determined for each confidence level. For example, confidence level 408 may represent a confidence level of $10^{-3}$. Thus, an elevation, such as elevation value 414, is determined where 99.9% of all elevation errors are to the left of the elevation. A similar mathematical approach is used to determine the safety margin for the other confidence levels.

Figure 5:
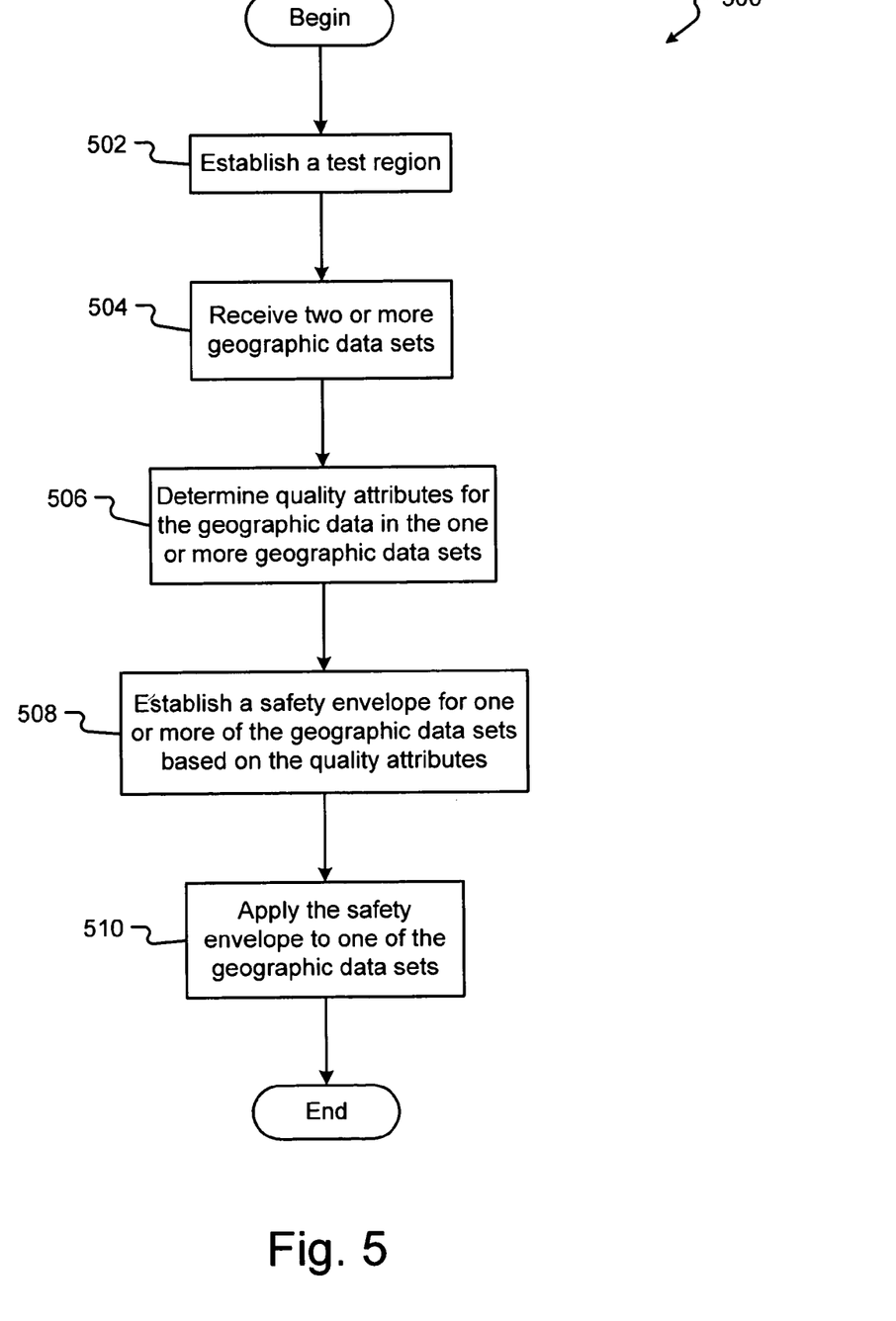
FIG. 5 is a flow diagram representing an embodiment for establishing quality attributes and a safety margin for a test region.

An exemplary method 500 for establishing quality attributes for a test region is shown in FIG. 5. Establish operation 502 establishes a test region. In embodiments, a region/test region selection module, such as region/test region selection module 306 (FIG. 3), selects the test region. A test region may be automatically selected or may be selected with user input. The test region, in embodiments, has certain characteristics, such as terrain type (e.g., geomorphologic regions including mountainous or rocky areas, rolling hills, or flat regions) or vegetation (e.g., rain forest, forest, swamp, or desert). In selecting the test region, a geographic area, such as a 5-by-5 mile box, is defined to encompass the test region.

Receive operation 504 receives two or more sets of terrain data for the test region. Determine operation 506 determines one or more quality attributes, such as an error in elevation, for one or more of the sets of terrain data for the test region. In embodiments, one set of terrain data is highly accurate, and one or more sets of terrain data are compared to the highly accurate set of terrain data. An error margin distribution is generated for each set of terrain data and assigned to that set of terrain data for the test region. An exemplary embodiment of determining quality attributes is described below in conjunction with FIG. 6.

Establish operation 508 establishes a safety envelope for the test region. In embodiments, a confidence level is received. The confidence level specifies a statistical requirement for the safety margin, e.g., only 1 in a thousand elevations should be above the safety envelope. The confidence level is applied to the error margin distribution to determine an elevation that meets the confidence level. The determined elevation becomes the safety margin.

Apply operation 510 applies the safety margin to the set of terrain data for which the error margin distribution applies. In other words, for each data point, the safety margin elevation is added to the elevation for that data point. The new elevations, with the applied safety margin applied, are stored as an optimal terrain database for the test region. In addition, applying the safety margin to elevations of other regions having characteristics similar or the same as the test region can generate new elevations (i.e., a safety envelope) for those other regions.

Figure 6:
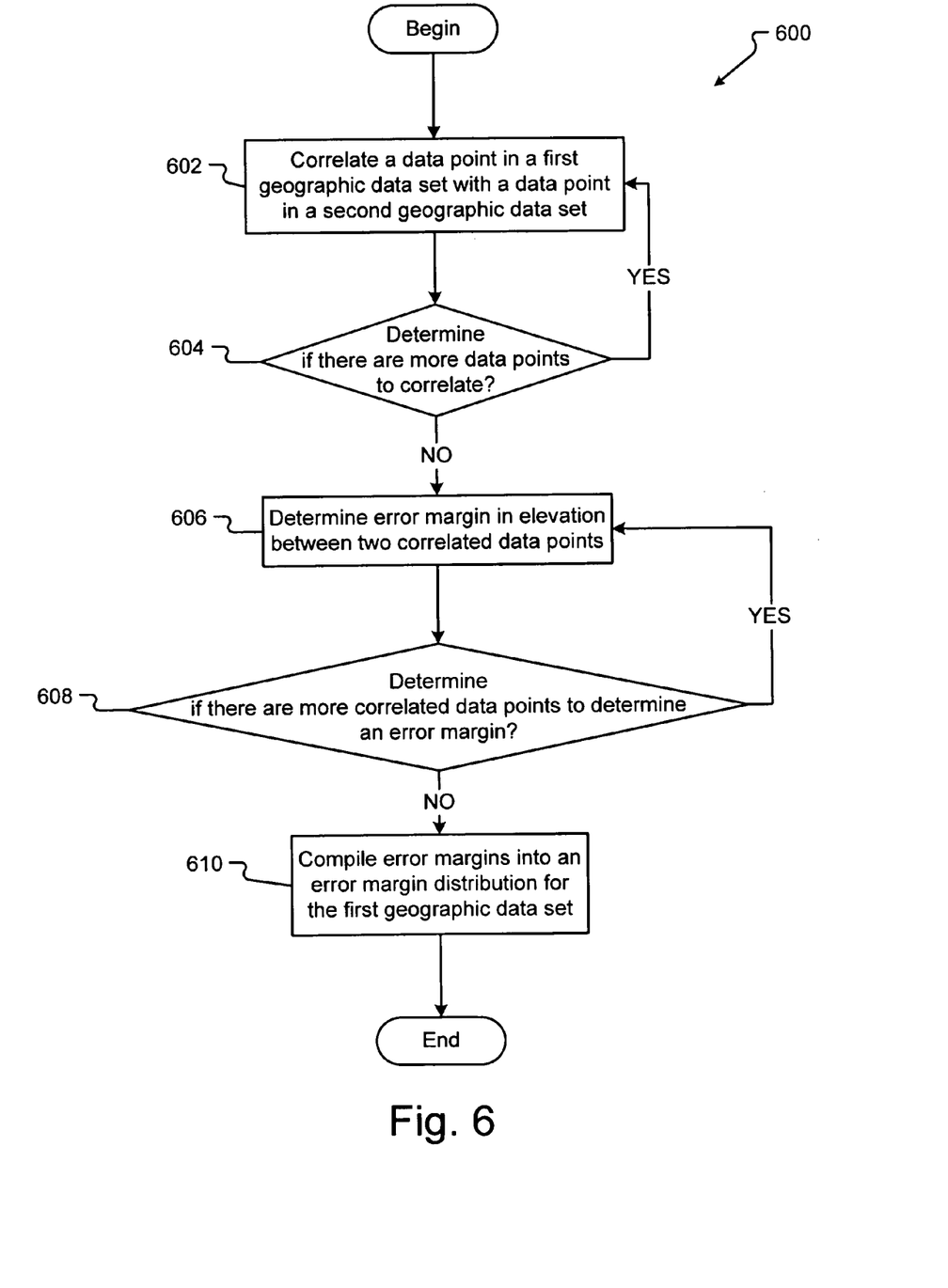
FIG. 6 is a flow diagram representing an embodiment for determining an error margin distribution for a test region.

An exemplary embodiment of a method 600 for comparing two sets of terrain data is shown in FIG. 6. Correlate operation 602 correlates a data point in a first set of terrain data with a data point in a second set of terrain data. In embodiments, the location, such as the longitude and latitude, of a data point in a first set of terrain data is determined. The locations of data points in the second set of terrain data are scanned looking for a data point having the same or nearly the same location. In one embodiment, the distance between the locations of the data points in the first and second set of terrain data is calculated using the Pythagorean Theorem. The distance is equal to the square root of the sum of the difference in latitude between the data points squared and the difference in longitude between the data points squared, i.e., $\text{Dist.}=\sqrt{((\Delta\text{Latitude})^2+(\Delta\text{Longitude})^2)}$. While this simple calculation works for two points that are in close proximity, a more complicated equation may be needed if distance errors arise because the surface of the earth is curvilinear, i.e., the latitude and longitude values in a first set of terrain data may not have the same elevation as the latitude and longitude values in a second set of terrain data. In embodiments, for more complicated situations, the formula to find the great circle distance between two points is determined by:

$$\text{Dist.} = 2*\arcsin\left(\sqrt{\left(\sin\left(\frac{lat1-lat2}{2}\right)\right)^2 + \cos(lat1)*\cos(lat2)*\left(\sin\left(\frac{lon1-lon2}{2}\right)\right)^2}\right).$$

Once the data point in the second set of terrain data that is nearest to the data point in the first set of terrain data is discovered, the two data points are correlated. In embodiments, there is only one correlated data point in the second set of terrain data for each data point in the first set of terrain data.

However, in embodiments, the second set of terrain data may also have a higher resolution. In other words, for every predetermined area, the second set of terrain data will have more data points than the first set of terrain data. In one embodiment, correlate operation 602 may search all the data points in the second set of terrain data that are within a predetermined distance from a data point in the first set of terrain data and then select the data point in the second set having the greatest difference in elevation with the correlated data point in the first data set. For instance, correlate operation 602 may look at every point in the second set of terrain data that is within a radius of 100 meters of the location of a data point in the first set of terrain data. The data point in the second set of terrain data having the largest difference in elevation may be correlated to the data point in the first set of terrain data. In this way, additional errors or inaccuracies resulting from the difference in resolution between the two sets of terrain data will be compensated for by correlating those points within the two data sets having the largest discrepancy, thereby padding the safety margin that is applied.

Determine operation 604 determines if there are more data points in the first set of terrain data that have yet to be correlated to a data point in the second set of terrain data. If there are more data points to be correlated, the flow branches YES to correlate operation 602. However, if there are no more data points to be correlated, the flow branches NO to determine operation 606. Determine operation 606 calculates an error in elevation between the correlated data points. In embodiments, the elevation value for the data point in the first set of terrain data is subtracted from the elevation value for the data point in the second set of terrain data. Thus, if the elevation for the data point in first set of terrain data is greater, a negative error is recorded. The error margin in elevation is assigned to the correlated data points.

Determine operation 608 determines if there are more correlated data points that require a calculated elevation error margin. If there are more correlated data points that have yet to have an error margin calculated, the flow branches YES to determine operation 606. If there are no more correlated data points that require an error margin calculation, the flow branches NO to compile operation 610. Compile operation 610 compiles all the error margin values into an error margin distribution. In embodiments, the error margin distribution contains information on the number of occurrences for each error margin in elevation, such as is shown in the exemplary distribution in FIG. 4. In further embodiments, other quality attributes include, but are not limited to, mean error margin, variance in error margin, standard deviation in error margin, mode of the errors, greatest error margin in elevation, and least amount of error margin in elevation.

Figure 7:
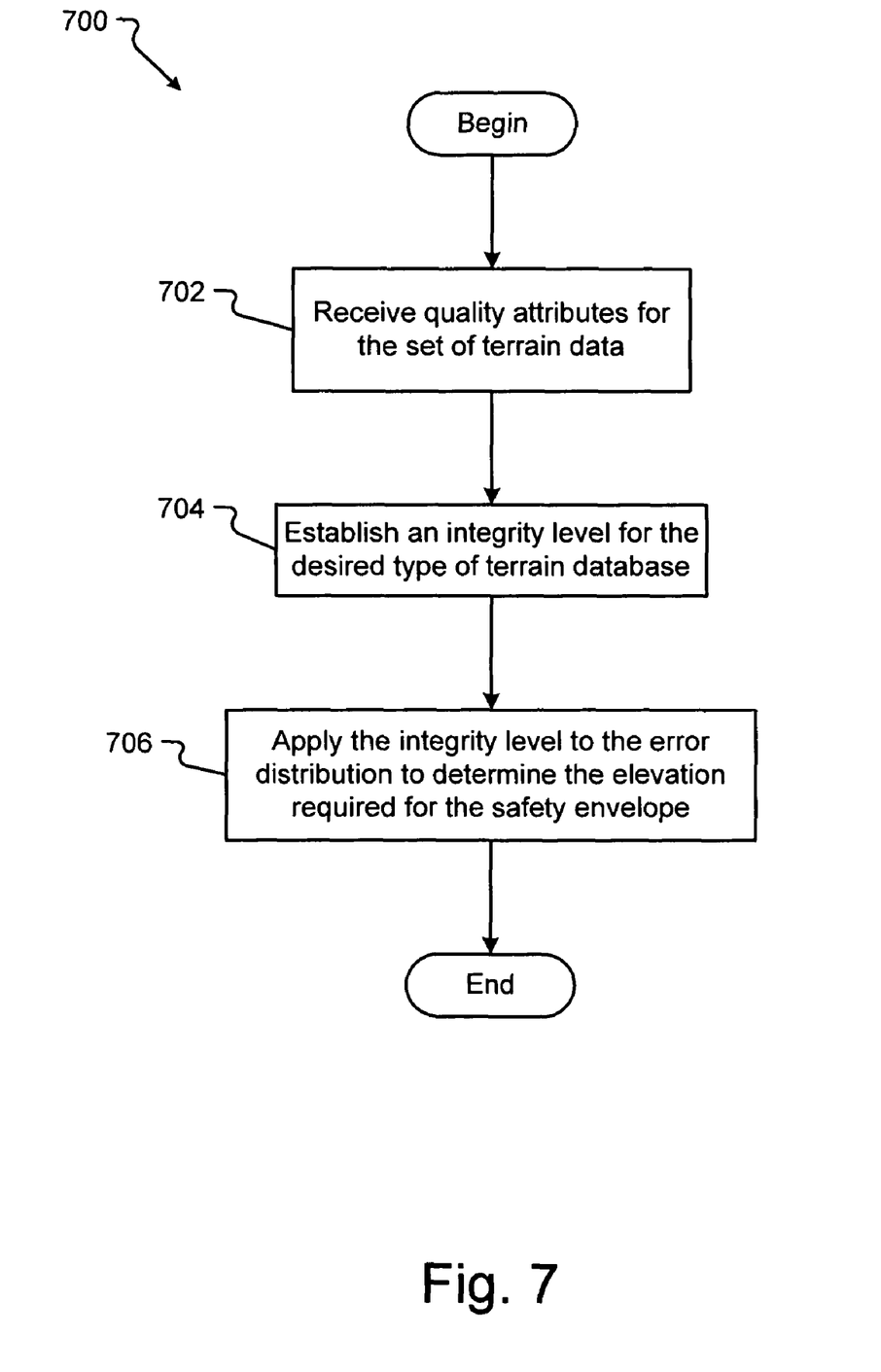
FIG. 7 is a flow diagram representing an embodiment for establishing a safety margin for a test region based on an error margin distribution.

An exemplary embodiment of a method 700 for generating a safety envelope is shown in FIG. 7. Receive operation 702 receives quality attributes, such as an error margin distribution, for the set of terrain data for the test region. Establish operation 704 establishes a confidence level for the terrain database. In one embodiment, a user inputs a desired confidence level, such as $10^{-3}$.

Apply operation 706 applies the confidence level to the error margin distribution to determine a safety margin, as explained in conjunction with FIG. 4. In one embodiment, an elevation is chosen where the number of elevation error margins below the chosen elevation equals the confidence level. For example, if the confidence level is $10^{-3}$, only one in a thousand elevation error margins in the error margin distribution will be above the elevation chosen. One skilled in the art will recognize the statistical computations required to determine this elevation.

Figure 8:
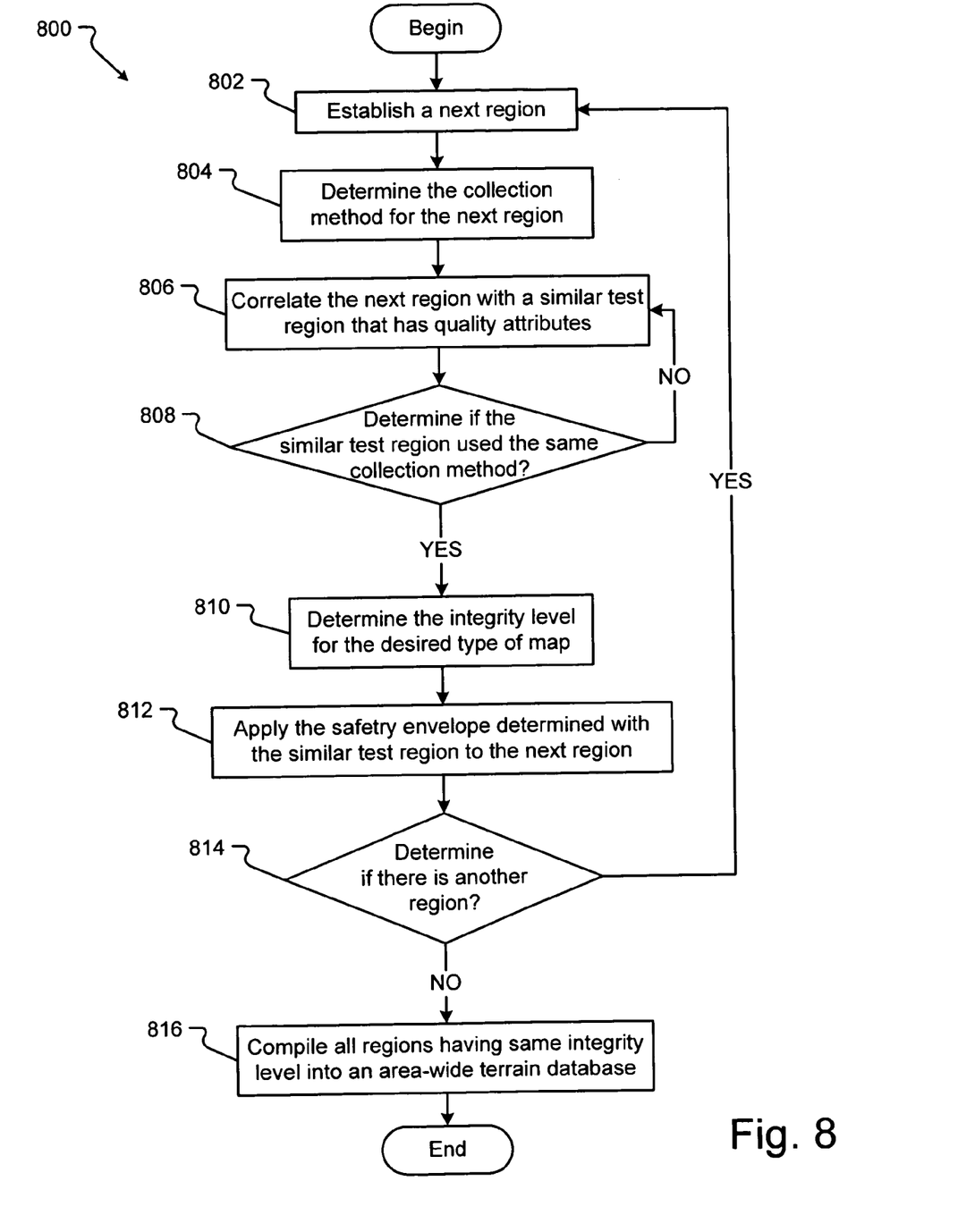
FIG. 8 is a flow diagram representing an embodiment for generating a world-wide terrain database having safety margins applied to all regions.

An exemplary embodiment of a method 800 for generating an area-wide terrain database with the same confidence level is shown in FIG. 8. Establish operation 802 establishes a next region (where at least one test region has already been created). The next region is again a bounded geographic area, such as a 20-by-20 mile box, and has certain characteristics, e.g., the region is a mountainous region.

Determine operation 804 determines the type of collection method(s) used to obtain the one or more sets of terrain data for the next region. For instance, the region may include data from two sets of terrain databases, one using SRTM and the other utilizing a physical survey. Correlate operation 806 correlates the next region with a previously established test region. In embodiments, a test region with similar characteristics to the next region is determined. For example, the two regions may both constitute mountainous regions. The test region already has a set of calculated quality attributes.

During correlation of the regions, determine operation 808 determines if the two regions used a similar collection method, e.g., SRTM, to obtain the terrain data. In embodiments, the collection method used to obtain the terrain data is one of the characteristics of the region. If the correlated regions do not share at least one like collection method, the flow branches NO to correlation operation 806 to find another test region with similar characteristics. However, if the correlated regions do share a common collection method, the flow branches YES to establish operation 810.

Establish operation 810 sets the confidence level for the desired terrain database. In embodiments, a commercial or governmental organization establishes confidence levels for certain terrain databases. For instance, a terrain database used to land commercial aircraft may have a very high confidence level, e.g., one in a million elevations are out of the safety envelope. All terrain data within the terrain database must meet this confidence level. Thus, the confidence level is input or otherwise established.

Apply operation 812 applies the safety margin from the similar test region to the next region. In embodiments, the safety margin elevation determined for the test region using the same confidence level is applied to all elevations in the next region. Determine operation 814 determines if there is another region in the area-wide terrain database that has yet to have a safety margin applied. If there is another region, the flow branches YES to establish operation 802. If there is not another region, the flow branches NO to compile operation 816.

Compile operation 816 compiles all the regions into an area-wide terrain database having a uniform confidence level. As such, the terrain database creator does not need to do a statistical analysis on each region. Rather, by determining one safety margin for a test region and applying the determined safety margin to like regions, i.e., regions having similar characteristics, the terrain database creator generates an area-wide terrain database having a predetermined confidence level.

As an example, consider two desert regions, the Gobi Desert, in Mongolia, and the Mojave Desert. Both desert regions may form a region having similar characteristics, e.g., sandy dunes, dry, little vegetation, etc. Each region may have terrain data from a lower accuracy but prolific collection method, such as SRTM. However, the region encompassing the Gobi Desert may not have any highly accurate terrain data due to the remoteness and general inaccessibility of the region. In contrast, the region (or a part of the region) encompassing the Mojave Desert may have highly accurate terrain data from another collection source, such as LIDAR, because much of this region is more accessible to those with the resources to produce the highly accurate and costly terrain data. As such, a portion of the region encompassing the Mojave Desert, such as a 5-by-5 mile region with highly accurate terrain data, is determined to be a test region.

A comparison between the highly accurate terrain data and the less accurate terrain data for the Mojave Desert test region can generate an error margin distribution, as shown in FIG. 4. With a certain confidence level, a safety margin is generated with the error margin distribution. The safety margin is then applied to the less accurate terrain data to generate an optimal terrain data set for the entire Mojave Desert region.

Further, the safety margin used with the Mojave Desert test region can also be applied to like regions. Thus, the Gobi Desert and the Mojave Desert have similar characteristics. Yet, no highly accurate terrain data exists for the Gobi Desert region. The safety margin generated for the Mojave Desert test region is applied to the terrain data for the entire Gobi Desert region. By using this process, highly accurate terrain data for one test region can be used to assess the quality of terrain data collection methods in certain other regions. This knowledge allows more accurate terrain databases to be generated for regions that have not undergone more accurate surveys.

Although the present exemplary embodiments have been described in language specific to structural features, methodological acts, and computer readable media containing such acts, it is to be understood that the scope of the disclosure defined in the appended claims is not necessarily limited to the specific structure, acts, or media described. One skilled in the art will recognize other embodiments or improvements that are within the scope and spirit of the disclosure. Therefore, the specific structure, acts, or media are disclosed as exemplary embodiments.

What is claimed is:

1. A method for generating an optimized terrain database for at least one region, comprising:

designating a first region as a test region;

receiving first and second sets of terrain data for the test region, wherein each set of terrain data includes a plurality of data points, the first set of terrain data collected utilizing a first terrain data collection method and including a first quantity of data points, the second set of terrain data collected utilizing a second terrain data collection method and including a second quantity of data points, the first quantity greater than the second quantity;

correlating data points in the first set of terrain data with data points in the second set of terrain data that are in substantially the same location;

determining elevation error margins for the first set of terrain data based on the data point correlations;

establishing a safety margin for the test region based on the elevation error margins determined for the correlated points within the first set of terrain data;

applying the safety margin to the remaining data points in the first set of terrain data that have not been correlated to data points in the second set of terrain data, to create an optimized terrain model for the entire first test region; and applying the safety margin to a set of terrain data for a second region having terrain quality characteristics similar to terrain quality characteristics of the first test region to create an optimized terrain database for the second region, the set of terrain data for the second region collected utilizing the first terrain data collection method.

2. A method defined in claim 1, wherein the terrain quality characteristics include a similar type of terrain.

3. A method defined in claim 1, further comprising compiling sets of optimized terrain data from a plurality of regions into an area-wide terrain database.

4. A method defined in claim 1, wherein establishing a safety margin for the test region based on the elevation error margins comprises generating an elevation error margin distribution.

5. A method defined in claim 4, wherein establishing the safety margin further comprises:

receiving a confidence level; and determining an elevation within the elevation error margin distribution that correlates to the confidence level.

6. A method defined in claim 1, wherein the second terrain data collection method has a greater accuracy that the first terrain data collection method.

7. A computer-based system including a processor and an associated memory, said system operable for generating an optimal terrain database for at least one region by executing a plurality of program modules, the program modules comprising:

a region/test region selection module operable for user selection of a test region having at least one terrain quality characteristic;

a quality attribute module that generates elevation error margins for a first set of terrain data collected using a first terrain data collection method based on a second set of terrain data collected using a second collection method;

a safety margin module that determines a safety margin for the test region from the elevation error margins for the first set of terrain data; and a correlation module that applies the safety margin for the test region to one or more other regions having terrain quality characteristics similar to the test region to create an optimized terrain database for the one or more other regions, the set of terrain data for the one or more other regions collected utilizing the first terrain data collection method.

8. A computer-based system defined in claim 7, wherein the region/test region selection module selects the regions according to terrain quality characteristics associated with the test region.

9. A computer-based system defined in claim 8, wherein the terrain quality characteristics comprise a type of terrain.

10. A computer-based system defined in claim 7, wherein the quality attribute module is configured to correlate those data points in the first set of terrain data with data points in the second set of terrain data that are in substantially the same location, the second terrain data collection method having a greater accuracy that the first terrain data collection method.

11. A computer-based system defined in claim 10, wherein the quality attribute module generates an error margin distribution of elevation error margins based on the correlation of data points.

12. A computer-based system defined in claim 11, wherein the safety margin module determines the safety margin from the error margin distribution.

13. A computer-based system defined in claim 7, wherein the safety margin module receives a confidence level and generates the safety margin elevation based on the confidence level.

14. A computer-readable medium forming an optimized terrain database having stored thereon a data structure, comprising:

a first set of terrain data; and a safety envelope applied to the first set of terrain data, wherein the safety envelope is created by comparing the first set of terrain data collected utilizing a first terrain data collection method to a second set of terrain data collected utilizing a second terrain data collection method, wherein:

the first set of terrain data includes data for a plurality of defined regions within the optimized terrain database;

the first and second sets of terrain data are compared for a first defined region to generate elevation error margins and define an optimized terrain model for the first defined region; and the safety envelope is applied to the first set of terrain data for a second defined region to create an optimized terrain database for the second defined region, provided that the first and second defined regions have similar characteristics.

* * * * *